(12) United States Patent
Xi et al.

(10) Patent No.: US 12,476,675 B2
(45) Date of Patent: Nov. 18, 2025

(54) PROVIDING CHANNEL STATE INFORMATION (CSI) FEEDBACK

(71) Applicant: QUALCOMM Incorporated, San Diego, CA (US)

(72) Inventors: Wei Xi, Beijing (CN); Rui Hu, Beijing (CN); Chenxi Hao, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/564,858

(22) PCT Filed: Sep. 3, 2021

(86) PCT No.: PCT/CN2021/116370
§ 371 (c)(1),
(2) Date: Nov. 28, 2023

(87) PCT Pub. No.: WO2023/028976
PCT Pub. Date: Mar. 9, 2023

(65) Prior Publication Data
US 2024/0275440 A1    Aug. 15, 2024

(51) Int. Cl.
*H04B 7/0456* (2017.01)
*H04L 5/00* (2006.01)

(52) U.S. Cl.
CPC ......... *H04B 7/0456* (2013.01); *H04L 5/0051* (2013.01)

(58) Field of Classification Search
CPC .. H04B 7/0626; H04B 7/0456; H04B 7/0639; H04B 7/0478; H04B 7/0632; H04B 7/063; H04B 7/024; H04B 7/0658; H04L 5/0048; H04L 5/0057; H04L 1/0026; H04L 5/0051; H04L 5/005; H04L 5/00; H04L 41/16; H04L 1/0029; H04L 25/0224;
(Continued)

(56) References Cited

U.S. PATENT DOCUMENTS

2014/0192918 A1* 7/2014 Park .................. H04W 88/02
                                                      375/267
2020/0052861 A1* 2/2020 Li ..................... H04L 5/0007
(Continued)

FOREIGN PATENT DOCUMENTS

WO    2020118549 A1    6/2020

OTHER PUBLICATIONS

International Search Report and Written Opinion—PCT/CN2021/116370—ISA/EPO—Mar. 11, 2022.
(Continued)

*Primary Examiner* — Eva Y Puente
(74) *Attorney, Agent, or Firm* — Patterson & Sheridan LLP

(57) ABSTRACT

Aspects of the present disclosure provide techniques for reducing channel state information (CSI) feedback overhead sent from one or more user equipments (UEs) to a network entity, such as a base station (BS) or gNodeB (gNB), while ensuring correct mapping of the CSI feedback at the network entity. In some cases, the overhead reduction may be achieved by converting the CSI feedback to size-reduced and further quantized representative coefficients (e.g., for multiple UEs). The quantized coefficients allow the network entity to recover the CSI feedback by de-quantizing and correctly mapping the quantized coefficients to recover the CSI feedback.

30 Claims, 10 Drawing Sheets

(58) Field of Classification Search
CPC ..... H04W 24/10; H04W 24/02; H04W 72/21; H04W 72/542; H04W 24/08; H04W 28/06; H04W 8/24; H04W 72/23; H04W 76/27
See application file for complete search history.

(56) References Cited

U.S. PATENT DOCUMENTS

| | | | | |
|---|---|---|---|---|
| 2020/0366326 | A1* | 11/2020 | Jassal | G06N 3/08 |
| 2022/0077911 | A1* | 3/2022 | Sergeev | H04B 7/0658 |
| 2022/0264352 | A1* | 8/2022 | Bhorkar | H04L 5/0057 |
| 2022/0417776 | A1* | 12/2022 | Manolakos | H04L 5/0048 |
| 2023/0246695 | A1* | 8/2023 | Wang | H04B 7/0626 |
| | | | | 375/267 |
| 2023/0300765 | A1* | 9/2023 | Koorapaty | H04J 11/00 |
| | | | | 370/330 |
| 2024/0380442 | A1* | 11/2024 | Zhang | H04B 7/0417 |

OTHER PUBLICATIONS

Lu Z., et al., "Multi-Resolution CSI Feedback with Deep Learning in Massive MIMO System", Arxiv.org, Cornell University Library, 201 OLIN Library Cornell University Ithaca, NY 14853, May 27, 2021 (May 27, 2021), XP081948295, 6 Pages, Cited in the Application Chapter I.

* cited by examiner

PROVIDING CHANNEL STATE INFORMATION (CSI) FEEDBACK

CROSS-REFERENCE TO RELATED APPLICATIONS

This application is a national stage application under 35 U.S.C. 371 of PCT/CN2021/116370 filed Sep. 3, 2021, which is hereby expressly incorporated by reference herein in its entirety as if fully set forth below and for all applicable purposes.

BACKGROUND

Field of the Disclosure

Aspects of the present disclosure relate to wireless communications, and more particularly, relate to providing channel state information (CSI) feedback.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include reducing transmission overhead of channel state information (CSI) feedback, such as in massive multi-input multi-output (MIMO) systems.

Certain aspects provide a method for wireless communications by a user equipment (UE). The method generally includes: processing CSI reference signal (CSI-RS) measurements to generate a plurality of coefficients based on a codebook, the codebook including a plurality of sparsity pattern candidates; determining a sparsity pattern based on the plurality of coefficients generated when processing the CSI-RS measurements; computing one or more quantized coefficients based on the sparsity pattern and the plurality of coefficients; and transmitting the one or more quantized coefficients to a network entity.

Certain aspects provide a method for wireless communications by a network entity. The method generally includes: transmitting, to a UE, a codebook for encoding a plurality of sparsity pattern candidates; receiving an indication of a sparsity pattern based on a plurality of coefficients generated at the UE when processing a plurality of CSI-RS measurements; receiving one or more quantized coefficients representing the plurality of coefficients from the UE; and computing a plurality of recovered coefficients based on the one or more quantized coefficients and the sparsity pattern to represent the plurality of coefficients generated at the UE.

Certain aspects provide a UE in a wireless communications system. The apparatus generally includes: a memory; and a processor coupled to the memory and configured to: process CSI-RS measurements to generate a plurality of coefficients based on a codebook, the codebook including a plurality of sparsity pattern candidates; determine a sparsity pattern based on the plurality of coefficients generated when processing the CSI-RS measurements; compute one or more quantized coefficients based on the sparsity pattern and the plurality of coefficients; and transmit the one or more quantized coefficients to a network entity.

Certain aspects provide an apparatus in a wireless communications system. The apparatus generally includes: a memory; and a processor coupled to the memory and configured to: transmit, to a UE, a codebook for encoding a plurality of sparsity pattern candidates; receive an indication of a sparsity pattern based on a plurality of coefficients generated at the UE when processing a plurality of CSI-RS measurements; receive one or more quantized coefficients representing the plurality of coefficients from the UE; and compute a plurality of recovered coefficients based on the one or more quantized coefficients and the sparsity pattern to represent the plurality of coefficients generated at the UE.

Certain aspects provide an apparatus in a wireless communications system. The apparatus generally includes: means for processing CSI-RS measurements to generate a plurality of coefficients based on a codebook, the codebook including a number of sparsity pattern candidates; means for determining a sparsity pattern based on the plurality of coefficients generated when processing the CSI-RS measurements; means for computing one or more quantized coefficients based on the sparsity pattern and the plurality of coefficients; and means for transmitting the one or more quantized coefficients to a network entity.

Certain aspects provide an apparatus in a wireless communications system. The apparatus generally includes: means for transmitting, to a UE, a codebook for encoding a plurality of sparsity pattern candidates; means for receiving an indication of a sparsity pattern based on a plurality of coefficients generated at the UE when processing a plurality of CSI-RS measurements; means for receiving one or more quantized coefficients representing the plurality of coefficients from the UE; and means for computing a plurality of recovered coefficients based on the one or more quantized coefficients and the sparsity pattern to represent the plurality of coefficients generated at the UE.

Certain aspects provide a computer readable medium storing computer executable code. The code, when executed by a processing system, causes the processing system to perform operations generally including: processing CSI-RS measurements to generate a plurality of coefficients based on a codebook, the codebook including a number of sparsity pattern candidates; determining a sparsity pattern based on the plurality of coefficients generated when processing the CSI-RS measurements; computing one or more quantized coefficients based on the sparsity pattern and the plurality of coefficients; and transmitting the one or more quantized coefficients to a network entity.

Certain aspects provide a computer readable medium storing computer executable code. The code, when executed by a processing system in a network entity, causes the processing system to perform operations generally including: transmitting, to a UE, a codebook for encoding a plurality of sparsity pattern candidates; receiving an indication of a sparsity pattern based on a plurality of coefficients generated at the UE when processing a plurality of CSI-RS measurements; receiving one or more quantized coefficients representing the plurality of coefficients from the UE; and computing a plurality of recovered coefficients based on the one or more quantized coefficients and the sparsity pattern to represent the plurality of coefficients generated at the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
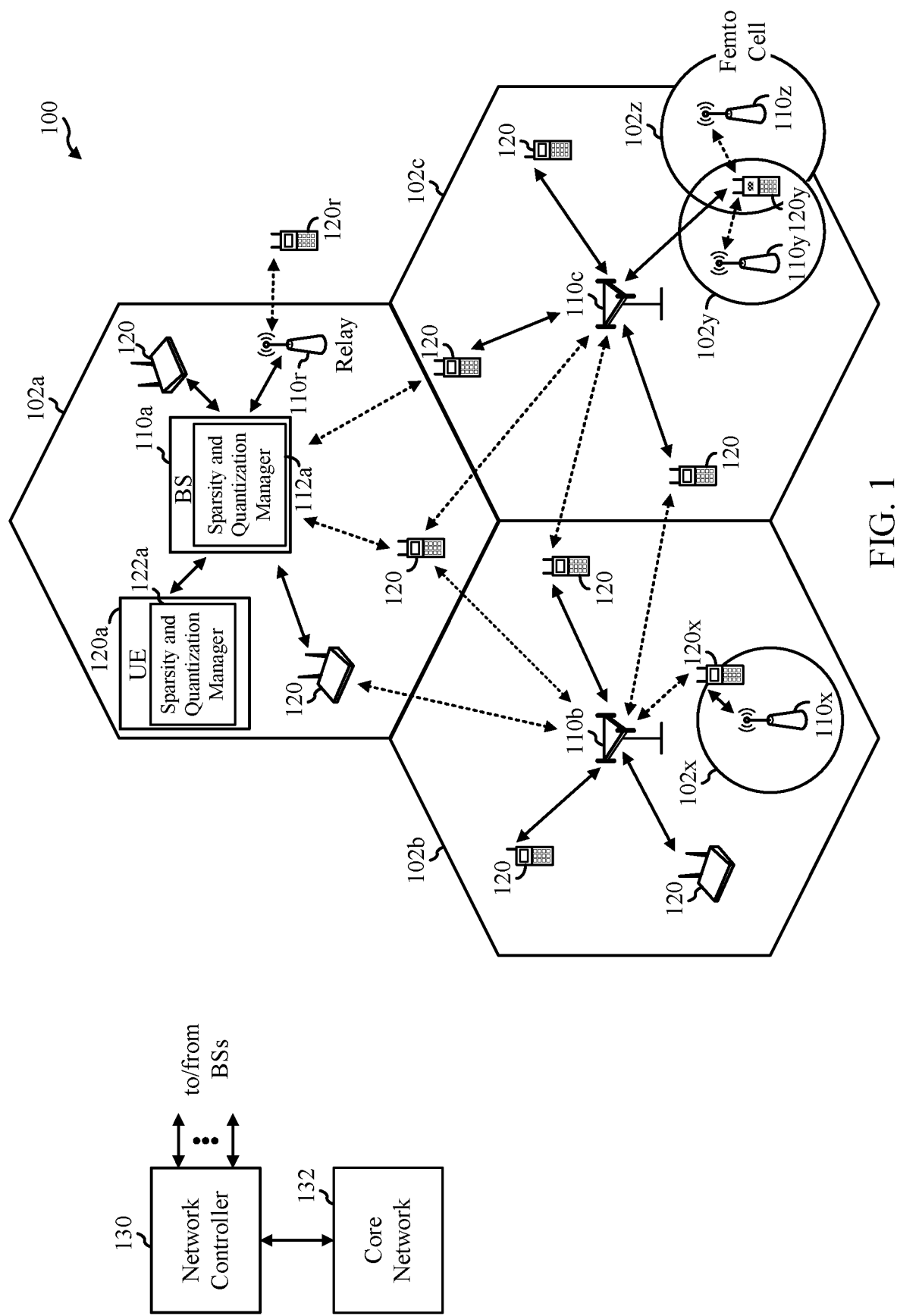
FIG. 1 is a block diagram conceptually illustrating an example telecommunications system, in accordance with certain aspects of the present disclosure.

Aspects of the present disclosure provide apparatus, methods, processing systems, and computer readable mediums for reducing channel state information (CSI) feedback overhead sent from one or more user equipments (UEs) to a network entity, such as a base station (BS) or gNodeB (gNB), while ensuring correct mapping of the CSI feedback or CSI report at the network entity. In some cases, the overhead reduction may be achieved by converting the CSI feedback to size-reduced and quantized or compressed representative coefficients (e.g., for multiple UEs). The quantized coefficients allow the network entity to recover the CSI feedback by de-quantizing and correctly mapping the quantized coefficients to recover the CSI.

For example, aspects of the present disclosure includes a UE processing CSI reference signal (CSI-RS) measurements. The CSI-RS measurements (e.g., received CSI-RS) may be processed using an artificial intelligence (AI) framework, such as a CSI encoder at the UE for encoding the CSI-RS measurements into coefficients, such as compressed codewords. The UE may then determine a sparsity pattern from a codebook based on the coefficients generated when processing the CSI-RS measurements. For example, the codebook may include a number of sparsity pattern candidates, each of which is denoted by a bitmap. A sparsity pattern may be jointly determined by the output (the coefficients) of the CSI encoder and the configured codebook (that includes the number of sparsity pattern candidates). In an aspect, the CSI encoder receives the CSI-RS measurements as input and generates a number of coefficients as output.

The UE transmits an indication of the determined sparsity pattern to the network entity. The UE computes one or more quantized coefficients based on the sparsity pattern and the number of coefficients. The quantized coefficients occupy substantially reduced size for transmission than the number of coefficients. The UE then transmits the one or more quantized coefficients to the network entity, which computes a number of recovered coefficients for representing number of coefficients computed at the UE. The network entity then recovers the CSI feedback using the recovered coefficients.

In certain modes of a new radio (e.g., 5G NR) system, such as in frequency division duplex mode, downlink channel state information (CSI) may be transmitted from a UE to a network entity (e.g., a BS, such as a gNB) through feedback links for assessing possible gains of a massive multiple-input multiple-output (MIMO) system. Due to the massive MIMO system configuration, such CSI feedback can be prohibitively expensive (e.g., excessive transmission overhead). Various techniques have been attempted for compressing the CSI feedback for transmission and reconstructing/recovering the CSI feedback thereafter.

For example, an artificial intelligence (AI) framework that employs neural network and machine learning may be trained to effectively transform the CSI feedback into certain size-reduced representations (e.g., codewords or coefficients) before transmission, and inversely transforming the representations to the CSI feedback upon reception by the network entity. The massive MIMO system may face large CSI feedback overhead problems when multiple UEs are operating in the same system. If the smaller coefficients are ignored and only the larger ones are fed back for each UE, the CSI feedback corresponding to different UEs may lose the UE-specific features and properties during reconstruction due to the incorrect mapping of the representations or transformed CSI feedback to the input of the neural network at the network entity for a corresponding UE. The present disclosure provides techniques for reducing the CSI feedback transmission overhead and allowing for correctly mapping the transformed CSI feedback or its representation to the input of the neural network at the network entity for a corresponding UE.

In certain aspects, the present disclosure further reduces the representations transformed from the CSI by reporting only a quantized or approximated version of the already size-reduced representations to further minimize the transmission size for the CSI feedback. For example, the quantized coefficients may effectively convey the information in the representation transformed from the CSI yet occupies about 25% of the size. The quantization may be based on a sparsity pattern determined by the UE using a codebook based on a number of coefficients generated when processing CSI-RS measurements. The quantized coefficients received by the network entity may be correctly mapped and recovered to the representation using the sparsity pattern. The network entity computes the recovered coefficients and their locations (e.g., in a matrix for transformation) in the original representation transformed from the CSI, and fills other locations with specified or preconfigured values, as further described below.

The following description provides examples of CSI feedback overhead reduction using quantized coefficients and associated mapping techniques, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, including later technologies.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. NR may and include support for half-duplex operation using time division duplexing (TDD). Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r) that receive a transmission of data and/or other information from an upstream station (e.g., a BS 110a or a UE 120r) and sends a transmission of the data and/or other information to a downstream station (e.g., a UE 120 or a BS 110) to facilitate communication between devices. A network controller 130 may couple to a set of BSs and provide coordination and control for these BSs. The network controller 130 may communicate with the BSs 110 via a backhaul.

The wireless communication network 100 may be an NR system (e.g., a 5G NR network). The devices may be configured for beam indication set determination. As shown in FIG. 1, the BS 110a has a sparsity and quantization manager 112a and the UE 120a has a sparsity and quantization manager 122a. The sparsity and quantization manager 112a may be configured to receive an indication of a sparsity pattern based on coefficients generated at the UE 120a, receive quantized coefficients from the UE 120a, and compute recovered coefficients, in accordance with aspects of the present disclosure. The sparsity and quantization manager 122a may be configured to determine a sparsity pattern based on coefficients generated when processing CSI-RS measurements and compute quantized coefficients from the large set of values of the coefficients for transmission, in accordance with aspects of the present disclosure. The sparsity and quantization manager 112a may be configured to determine a subset of the multiple configured beam indication sets based on the one or more parameters.

Figure 2:
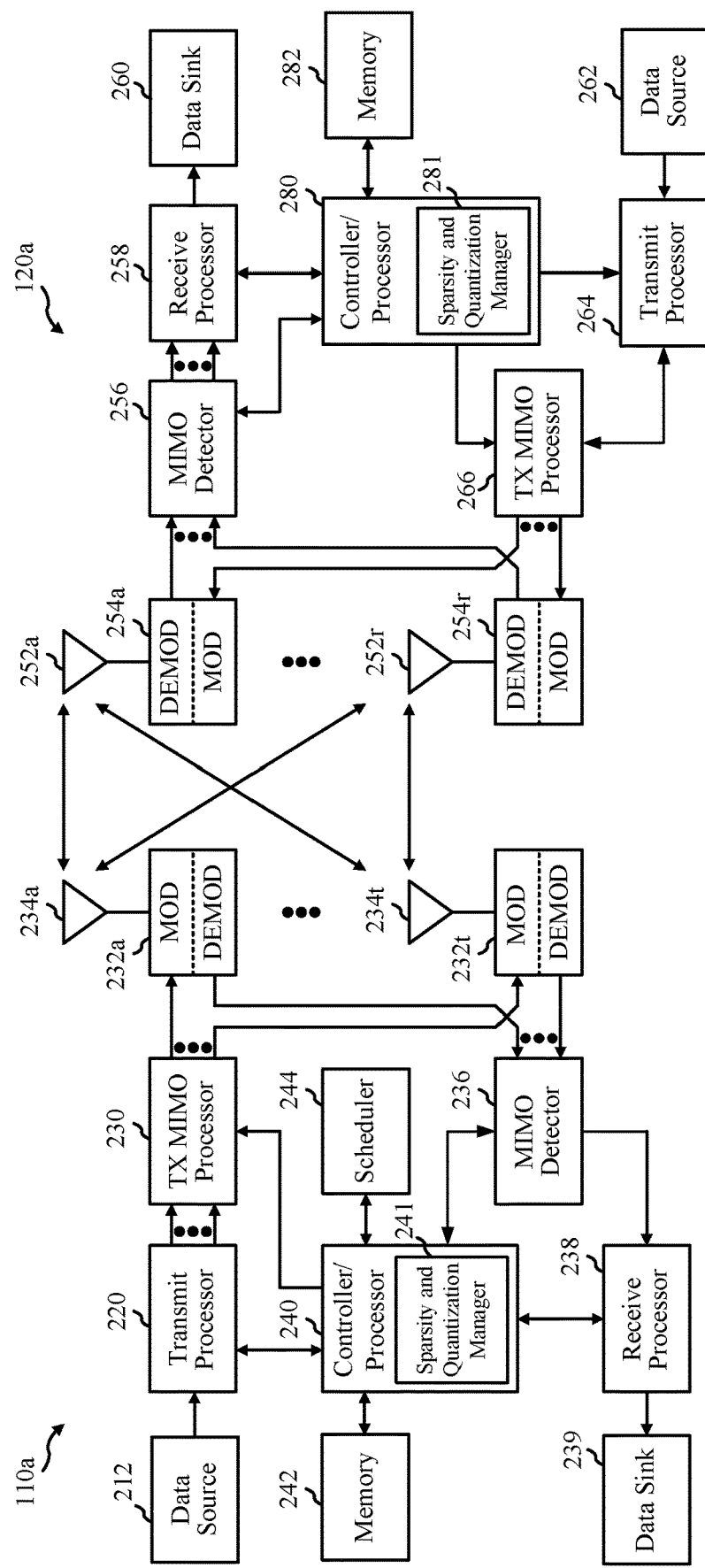
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120 may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120 and/or antennas 234, processors 220, 230, 238, and/or controller/processor 240 of the BS 110a may be used to perform the various techniques and methods described herein. For example, as shown in FIG. 2, the controller/processor 240 of the BS 110a has a sparsity and quantization manager 241 that may be configured for receiving an indication of a sparsity pattern based on coefficients generated at the UE 120a, receiving quantized coefficients from the UE 120a, and computing recovered coefficients; and for transmitting the CSI-RS, according to aspects described herein. The controller/processor 280 UE 120 has a sparsity and quantization manager 281 that may be configured for determining a sparsity pattern based on coefficients generated when processing CSI-RS measurements and computing quantized coefficients from the large set of values of the coefficients for transmission, according to aspects described herein. The memories 242 and 282 may store data and program codes for BS 110 and UE 120, respectively. A scheduler 244 may schedule UEs for data transmission on the downlink and/or uplink.

NR may utilize orthogonal frequency division multiplexing (OFDM) on the downlink and single-carrier frequency division multiplexing (SC-FDM) on the uplink. OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a "resource block" (RB), may be 12 consecutive frequency subcarriers (or 180 kHz). The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.). The symbol and slot lengths scale with the subcarrier spacing.

Figure 3:
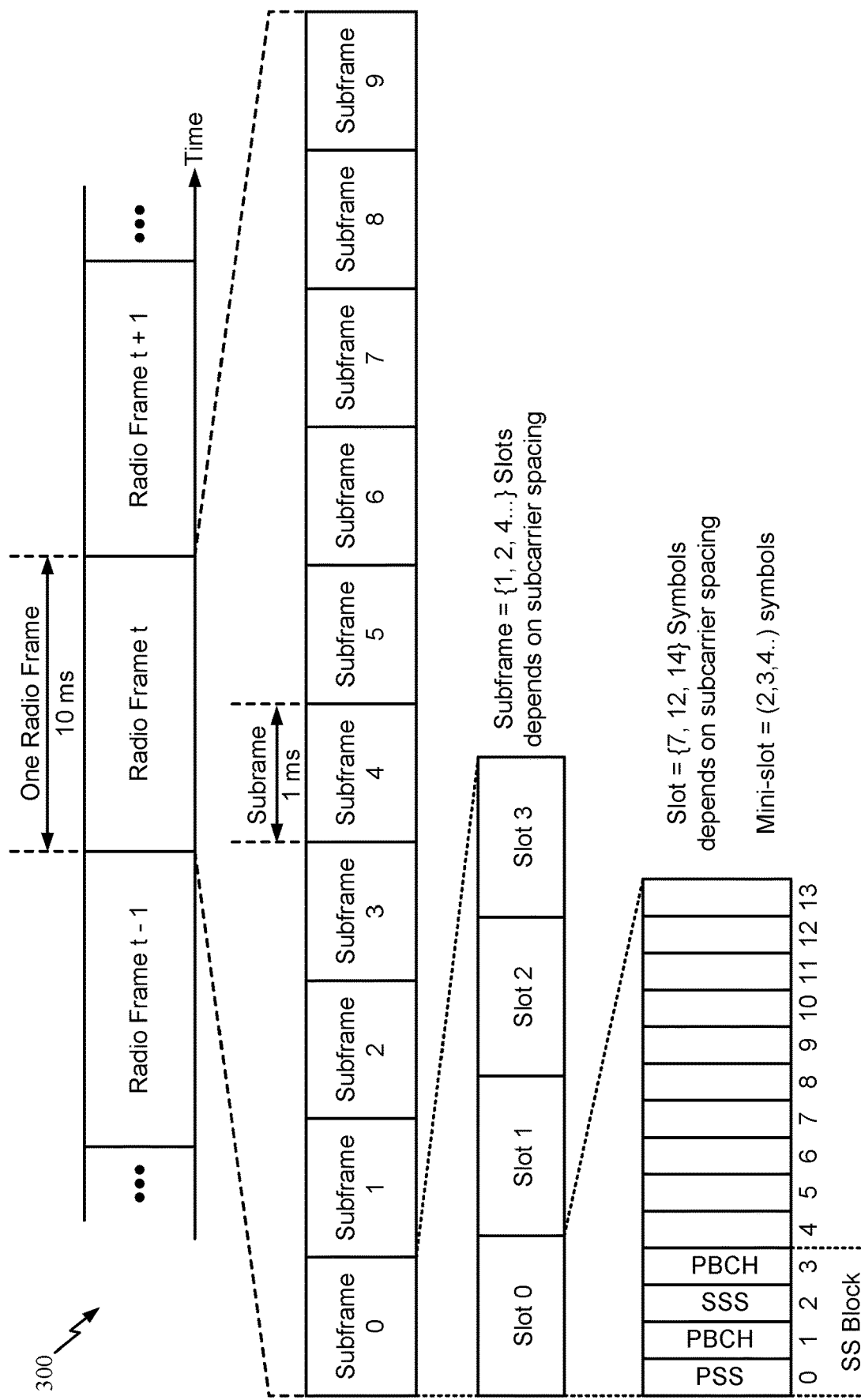
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., UE 120) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Example Channel State Information (CSI)
Feedback Using Artificial Intelligence (AI)
Framework Assistance Channel state information (CSI) may indicate a channel condition at a specific time. In massive multi-input multi-output (MIMO) systems, CSI allows base stations (BSs) to obtain real-time channel states for precoding. Uplink CSIs may be obtained by channel estimation while downlink CSIs often require feedback from UEs (e.g., in frequency division duplex systems). Due to the prohibitive high overhead of CSI feedback by multiple UEs for a large number of channels in mass MIMO applications, artificial intelligence (AI) frameworks are employed to transform the CSI into smaller payloads that are more efficient for transmissions and can be recovered or inversely transformed to CSI.

Figure 4:
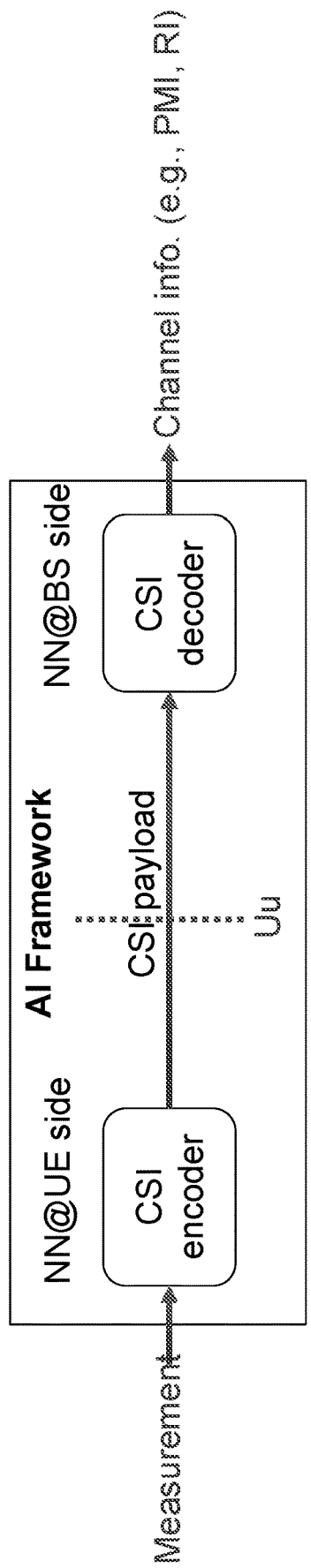
FIG. 4 is an example of using an artificial intelligence (AI) framework to aid channel state information (CSI) transmission, in accordance with certain aspects of the present disclosure.

FIG. 4 is an example of using an AI framework to aid CSI transmission, in accordance with certain aspects of the present disclosure. As shown, the AI framework receives measurements of CSI-RS and outputs channel information, such as precoding matrix indicator (PMI), rank indicator (RI), etc. The AI framework may include a CSI encoder on the UE side, and a CSI decoder on the network side. The CSI encoder may include a neural network (NN) for learning (e.g., by performing machine learning) a transformation from original channel matrices (or other equivalent quantities, e.g., measurements on CSI-RS) to codewords or other representations, which are referred to as CSI payload in FIG. 4. The CSI payload is transmitted from the UE to the network entity via Uu link. This machine learning process may be referred to as training that may be supervised with training data or unsupervised. The CSI encoder may learn to use underlying channel structure for transforming the channel matrices to codewords for reduced overhead transmission. The AI framework may include a CSI decoder on the network entity (e.g., BS) side. The CSI decoder may also include an NN for learning an inverse transformation from codewords to desired channel information, e.g., precoding vector(s) or even original channels.

The following description will not reiterate known examples of various AI frameworks for learning the transformation and inverse transformation of CSI feedback, such as "Deep Learning for Massive MIMO CSI Feedback" by Chao-Kai Wen et al. (arXiv:1712.08919v4 [cs.IT] 23 Apr. 2018, referred to as "CsiNet"), or "Multi-resolution CSI Feedback with deep learning in Massive MIMO System" by Zhilin Lu et al. (arXiv: 1910.14322v2 [cs.IT] 27 May 2021, referred to as "CRNet"), which are fully incorporated by reference herein. The following description focuses on the distinguishing aspects from the overhead reduction processes in CsiNet or CRNet, or other similar AI frameworks, if referenced to, cannot be used to limit the claimed AI framework in any manner contradictory to or inconsistent with the present disclosure.

Figure 5:
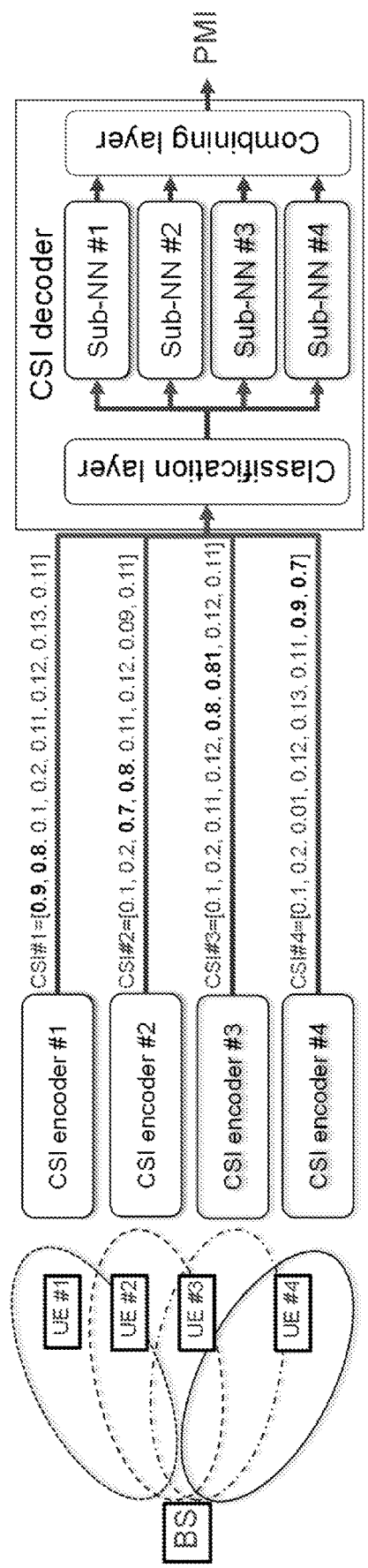
FIG. 5 is an example diagram illustrating a process flow of CSI transmission aided by an AI framework, in accordance with certain aspects of the present disclosure.

FIG. 5 is an example diagram illustrating a process flow of CSI transmission aided by an AI framework, in accordance with certain aspects of the present disclosure. As shown, the BS may by a massive MIMO system with many antennas to reduce multiuser (e.g., UE #1, UE #2, UE #3, and UE #4 as shown) interference and improve cell throughput by using CSI. In general, downlink CSI is acquired at the UE during training and transmitted to the BS through feedback links. By using an AI framework (such as the example shown in FIG. 4), the respective CSI encoders in the UEs may generate CSI codewords for the CSI feedback of each UE. The codewords are transmitted to the CSI decoder on the network entity side. The CSI decoder includes a classification layer, sub-neural networks corresponding to different codewords input, and a combining layer for inversely transforming and outputting the CSI. The CSI may include channel quality indicator (CQI), precoding matrix index (PMI), or rank indicator (RI).

The present disclosure provides techniques for further reduce the CSI payload output by the CSI encoders. As shown in FIG. 5, each of the CSI payload may include a certain number of predominant indicators (in bolded fonts). For example, in CSI #1=[0.9, 0.8, 0.1, 0.2, 0.11, 0.12, 0.13, 0.11], only two of the total eight coefficients may be worth transmission. CSI #2-4 are in similar situation while their predominant indicators are in different locations. As such, the CSI payload may be further compressed in size, such as by quantization or by other conversion or representation methods, when the compressed CSI payload can be correctly mapped to the original CSI payload position for each CSI decoder. The present disclosure provides techniques for realizing such quantization and mapping.

Example Channel State Information (CSI) Feedback Overhead Reduction Using Sparsity Patterns with Artificial Intelligence (AI) Framework Aspects of the present disclosure provide apparatus, methods, processing systems, and computer readable mediums for reducing CSI feedback overhead sent from one or more UEs to a network entity, while ensuring correct mapping (by avoiding recovery errors due to transmission payload compression or reduction) of the CSI feedback at the network entity. In some cases, the overhead reduction may be achieved by converting the CSI feedback to size-reduced and quantized or compressed representative coefficients (e.g., for multiple UEs). The quantized coefficients allow the network entity to recover the CSI feedback by de-quantizing and correctly mapping the quantized coefficients to recover the CSI.

Figure 6:
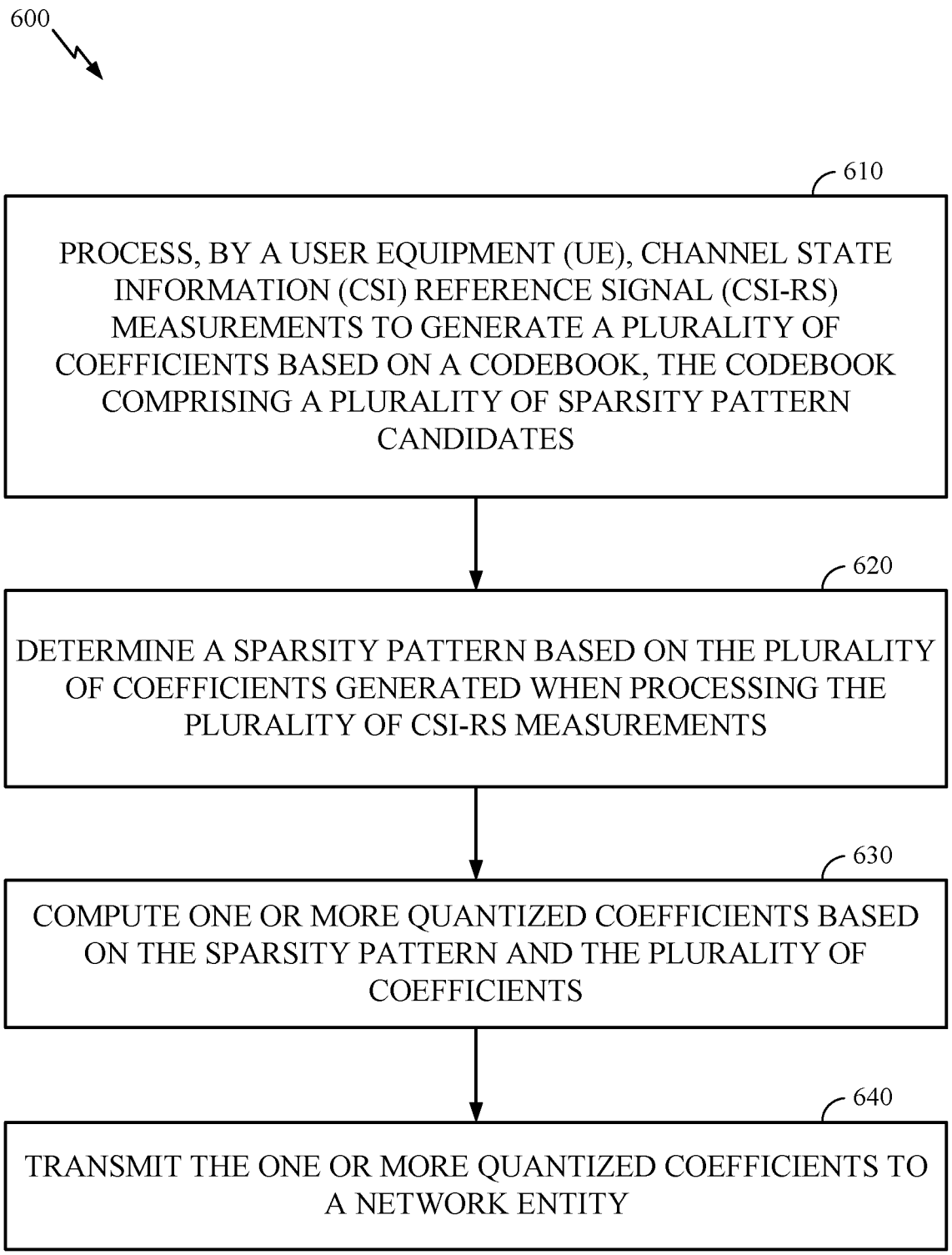
FIG. 6 is a flow diagram illustrating example operations for wireless communication by a UE, in accordance with certain aspects of the present disclosure.

FIG. 6 is a flow diagram illustrating example operations 600 for wireless communication by a UE, in accordance with certain aspects of the present disclosure. The operations 600 may be performed, for example, by a UE (e.g., the UE 120a in the wireless communication network 100). The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 begin, at 610, by processing channel state information (CSI) reference signal (CSI-RS) measurements to generate a plurality of coefficients based on a codebook. In some cases, the term "codebook" in the present disclosure may be different from the convention meaning of a set of precoding matrices or vectors. Here, a codebook may include a set of bitmaps corresponding to a set of sparsity patterns, as shown in the example below.

In aspects, the network entity transmits the codebook to the UE. The CSI-RS measurements may be processed or encoded into a number of sparsity pattern candidates based on the codebook. An example codebook may be represented with the following. Here, the codebook B includes a set of bitmaps. Each bitmap corresponds to a sparsity pattern candidate.

$B = \{[1, 1, 0, 0, 0, 0, 0, 0], [0, 0, 1, 1, 0, 0, 0, 0],$ $[0, 0, 0, 0, 1, 1, 0, 0], [0, 0, 0, 0, 0, 0, 1, 1]\}$

In certain aspects, the network entity may configure or determine the codebook according to the desired coverage, beam width, UE distribution, among other parameters or considerations. The network entity transmits or otherwise signal the codebook to the corresponding UE(s) (e.g., multiple codebooks may be configured for multiple UEs in a massive MIMO system, or a common codebook shared among multiple UEs where applicable).

At 620, the UE determines a sparsity pattern based on a number of coefficients generated and the codebook when processing the CSI-RS measurements. In aspects, the sparsity pattern may correspond with a bitmap corresponding to channel conditions specific to the UE. For example, the UE may include an encoder of an AI framework to identify a transformation from the CSI-RS measurements to a set of representative parameters or coefficients. As shown in the example of FIG. 5, each CSI encoder may generate a set of CSI payload such as CSI #3=[0.1, 0.2, 0.11, 0.12, 0.8, 0.81, 0.12, 0.11]. Among these eight coefficients, 0.8 and 0.81 are more significant than others. As such, the UE (UE #3) determines the sparsity pattern for the CSI #3 to be [0, 0, 0, 0, 1, 1, 0, 0] corresponding to the third codeword of the example codebook B above. This sparsity pattern may be denoted using only two bits "10" (e.g., two bits may indicate four values corresponding to the four codewords of the example codebook B). In some cases, the network entity signals the codebook to the UE and indicates the sparsity pattern using an index (e.g., "10" for CSI #3) of a codeword (e.g., the CSI payload) of the codebook. In some cases, the sparsity pattern may be indicated, or otherwise understood by the network entity, based on existing implicit agreements or common knowledge (e.g., other parameters or variables).

At 630, the UE computes one or more quantized coefficients based on the sparsity pattern and the number of coefficients generated by the CSI encoder. For example, the UE quantizes the 0.8 and 0.81 coefficients of the CSI #3 by applying a quantization function. In one example, the quantization function may use the following scale for each coefficient:

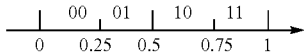

That is, for values of 0.8 and 0.81 that fall between 0.75 and 1, the quantization value is "11". In some cases, the quantized coefficients could be concatenated. In such cases, the one or more quantized coefficients are "1111" that represents the [0.8, 0.81] of the CSI #3 coefficients that have been reduced after applying the sparsity pattern. As such, the quantized coefficients may occupy a substantially smaller size (e.g., a four-bit indication instead of CSI #3) than the size of the plurality of coefficients output by the encoder. A different quantization function (e.g., of a different level of resolution based on bit size availability) may be used.

At 640, the UE transmits the one or more quantized coefficients to the network entity. In some cases, the UE may also indicate the sparsity pattern. For example, the UE may transmit "101111" to the network entity, where the first two bits "10" indicate the sparsity pattern corresponding to [0, 0, 0, 0, 1, 1, 0, 0] and the remaining bits "1111" represents the quantized values for [0.8, 0.81], which are [0.75, 0.75] per the example described above. The quantized coefficients may be considered as a transformation, conversion, or compression of the output by the CSI encoder and used as a CSI feedback for the network entity to decode, which will be discussed in relation to FIG. 7 below.

Figure 7:
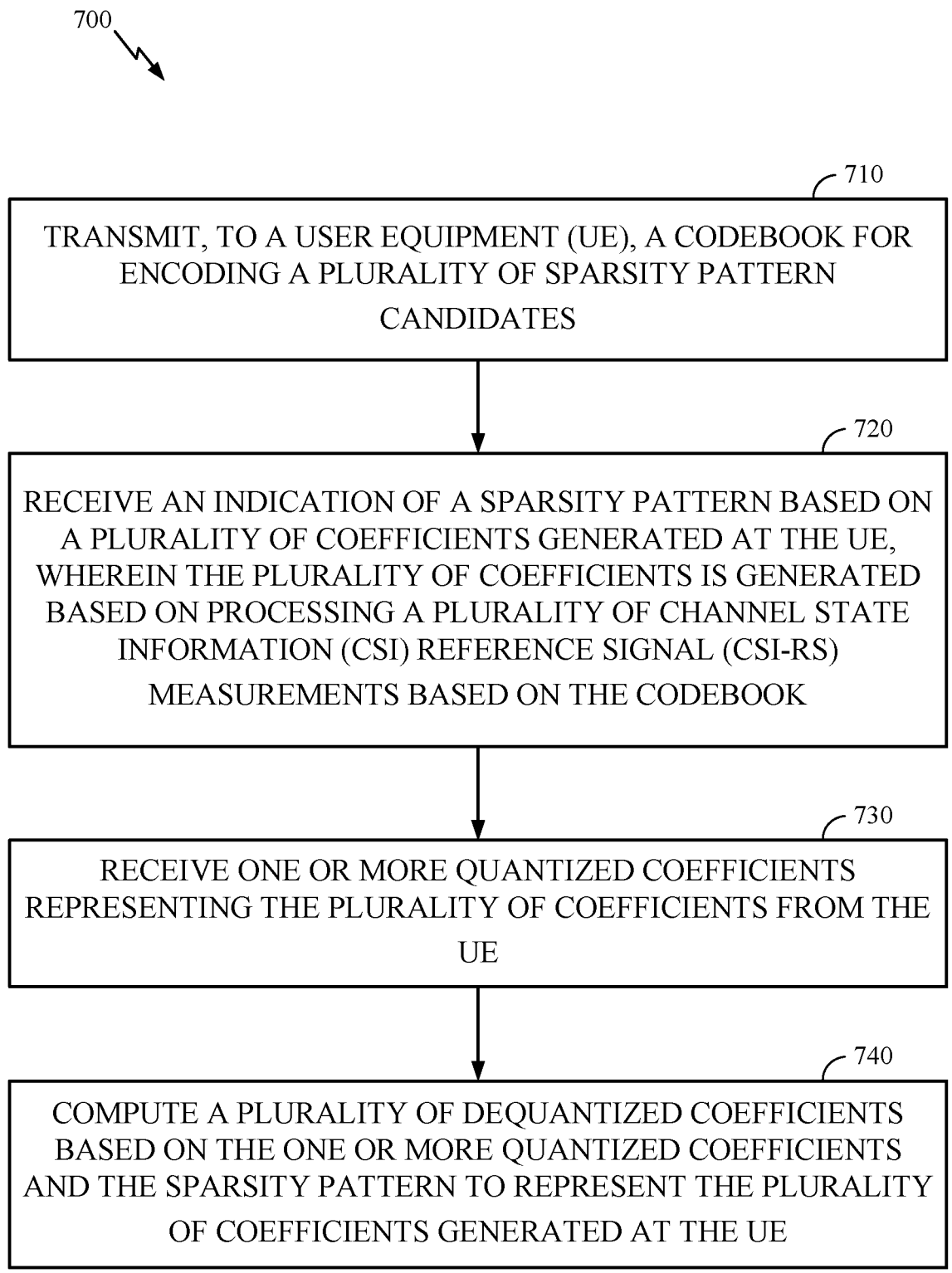
FIG. 7 is a flow diagram illustrating example operations for wireless communication by a network entity, in accordance with certain aspects of the present disclosure.

FIG. 7 is a flow diagram illustrating example operations 700 for wireless communication that may be considered complimentary to the operations 600. For example, operations 700 may be performed, by a network entity (e.g., the BS 110*a* in the wireless communication network 100 of FIG.

1). The operations 700 may be implemented as software components that are executed and run on one or more processors (e.g., controller/processor 240 of FIG. 2). Further, the transmission and reception of signals by the PCS in operations 700 may be enabled, for example, by one or more antennas (e.g., antennas 234 of FIG. 2). In certain aspects, the transmission and/or reception of signals by the PCS may be implemented via a bus interface of one or more processors (e.g., controller/processor 240) obtaining and/or outputting signals.

The operations 700 begin, at 710 by transmitting, to a UE, a codebook for encoding a plurality of sparsity pattern candidates. For example, the codebook may be the codebook B mentioned in FIG. 6.

At 720, the network entity receives an indication of a sparsity pattern based on a plurality of coefficients generated at the UE after processing a plurality of CSI-RS measurements. For example, the indication may be the "10" bits of the sparsity pattern described in FIG. 6. In some cases, the UE may transmit a report to the network entity indicating the determined sparsity pattern.

At 730, the network entity receives one or more quantized coefficients representing the plurality of coefficients from the UE. For example, the one or more quantized coefficients may be the "1111" bits for representing the plurality of coefficients [0.8, 0.81] based on the example quantization rules in the example discussed in FIG. 6.

At 740, the network entity computes a number of recovered coefficients based on the one or more quantized coefficients and the sparsity pattern to represent the plurality of coefficients generated at the UE. For example, based on the received "101111" the network entity may first identify coefficients [0.75, 0.75] based on "1111" using the same quantization function as shown in the example in FIG. 6. Then, based on the sparsity pattern indicated by "10" of the codebook B, the network entity computes the recovered coefficients to be [0, 0, 0, 0, 0.75, 0.75, 0, 0] as the CSI payload (thus, approximating the original CSI #3=[0.1, 0.2, 0.11, 0.12, 0.8, 0.81, 0.12, 0.11]).

With such conversion or approximation, transmission overhead is substantially reduced and the coefficients are correctly mapped to corresponding channels and UEs. The accuracy loss may be adjusted by applying different quantization functions, to balance (e.g., in a sliding scale) transmission overhead reduction and representation accuracy. For example, only some of the coefficients of the CSI payload output by the encoder will be transmitted. That is, in the above example, only two ([0.8, 0.81]) of the eight coefficients (CSI #3=[0.1, 0.2, 0.11, 0.12, 0.8, 0.81, 0.12, 0.11]) are to be transmitted by applying the sparsity pattern ([0, 0, 0, 0, 1, 1, 0, 0]), which is indicated using only two bits "10."

Figure 8:
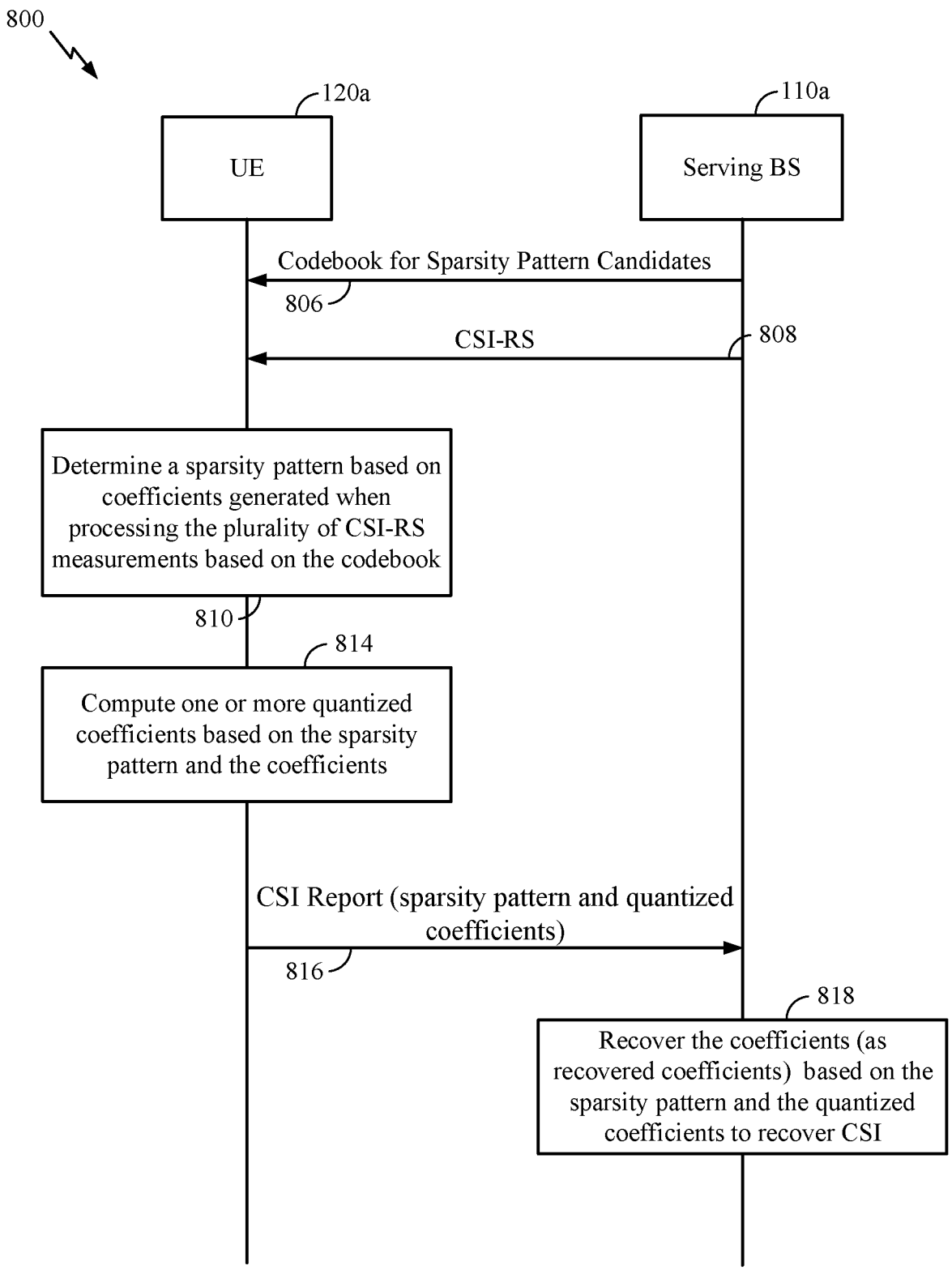
FIG. 8 is a call flow diagram illustrating example signaling for downlink beam indication set determination, in accordance with certain aspects of the present disclosure.

Operations 600 of FIG. 6 and 700 of FIG. 7 may be understood with reference to the call flow diagram of FIG. 8. FIG. 8 illustrates a call flow diagram showing communications among the UE and the BS, in accordance with certain aspects of the present disclosure. In aspects, the BS includes a CSI decoder of an AI framework while the UE includes a CSI encoder of the AI framework. In effect, the CSI encoder and decoder of the AI framework performs CSI compression (e.g., reduction by transformation) and decompression (e.g., recovery by inverse transformation) respectively in order to reduce transmission overhead of CSI feedback. In one aspect, UE-specific properties (e.g., channel conditions) may result in a sparsity in the output of CSI encoder (and the corresponding input for the CSI decoder). The sparsity may mean only some of the CSI payload presents significant values that dictate the CSI feedback while other values may be statistically omitted. In some cases, the UE-specific sparsity pattern may be a bitmap corresponding to UE features or properties (e.g., as a form of signature or fingerprint). This allows a correct mapping of the sparsity pattern to the UE. Furthermore, because the sparsity pattern may be limited in variations, only a few bits of data may be needed for indication.

As shown, the serving BS first transmits, at 806, a codebook for a number of sparsity pattern candidates to the UE. At 808, the BS transmits CSI reference signals (CSI-RS) to the UE. The UE may process the CSI-RS, for example, using the CSI encoder to generate CSI feedback coefficients.

At 810, the UE then determines or selects its sparsity pattern based on the output of the CSI encoder. The CSI encoder may output CSI feedback coefficients (e.g., CSI #1-4 shown in FIG. 5) generated after processing the CSI-RS measurements using the CSI encoder.

For example, a sparsity pattern may be elected from a specified or configured set, such as a bitmap codebook, such as the codebook B discussed above. The UE may receive a number of coefficients (e.g., CSI #1-4 as shown in FIG. 5) from the CSI encoder. The sparsity pattern is determined based on a matching relationship to the number of coefficients, such as in the case of CSI #3=[0.1, 0.2, 0.11, 0.12, 0.8, 0.81, 0.12, 0.11], the sparsity pattern is [0, 0, 0, 0, 1, 1, 0, 0] corresponding to the third codeword of the example codebook B above.

At 814, the UE (e.g., via the encoder of the AI framework) computes one or more quantized coefficients based on the sparsity pattern determined at 810 and the CSI feedback coefficients. The quantized coefficients occupy substantially smaller sizes than the CSI feedback coefficients. For example, the quantized coefficients "1111" may be used to represent quantized values of original coefficients [0.81, 0.8] (e.g., each "11" may represent 0.75 per the example described above).

At 816, the UE transmits a CSI report, which may include the sparsity pattern and the quantized coefficients to the BS.

For example, the CSI report may include a header that indicates the sparsity pattern determined by the UE, and a payload that indicates the quantized coefficients computed at 814. The CSI report enables the BS to perform inverse transformation to obtain the original CSI feedback coefficients. As described in the examples above, the UE transmits "101111" to the network entity to indicate the sparsity pattern "10" corresponding to [0, 0, 0, 0, 1, 1, 0, 0] and the quantized values "1111" that represents or indicates [0.8, 0.81]. Although the illustrated CSI report in FIG. 8 includes both the sparsity pattern and the quantized coefficients, in some cases, the sparsity pattern and the quantized coefficients may be separated indicated in different transmission occasions.

At 818, the BS and the CSI decoder therein recover the CSI feedback coefficients (e.g., a recovered version of the CSI payload) based on the sparsity pattern and the quantized coefficients in the CSI report. Based on the CSI feedback coefficients, the CSI decoder may output CSI (e.g., the PMI shown in FIG. 5) using the recovered CSI feedback coefficients.

For example, based on the sparsity pattern indicated by "10" of the codebook B, the network entity identifies the sparsity pattern to be [0, 0, 0, 0, 1, 1, 0, 0]. This sparsity pattern indicates, to the network entity, that only two coefficients were quantized at the UE (and need to be recovered). The network entity uses the bit values "1111" to determine (recover) the corresponding quantized coefficients [0.75, 0.75]. The network entity then maps the indicated recovered coefficients to corresponding locations indicated by the sparsity pattern and fill other remaining locations with predefined or preconfigured values (e.g., 0). This way, the network entity computes the recovered coefficients to be [0, 0, 0, 0, 0.75, 0.75, 0, 0] as the CSI feedback coefficients (representing a quantization of the original CSI #3=[0.1, 0.2, 0.11, 0.12, 0.8, 0.81, 0.12, 0.11]). The BS then uses such recovered coefficients to compute a recovered version of the CSI.

Figure 9:
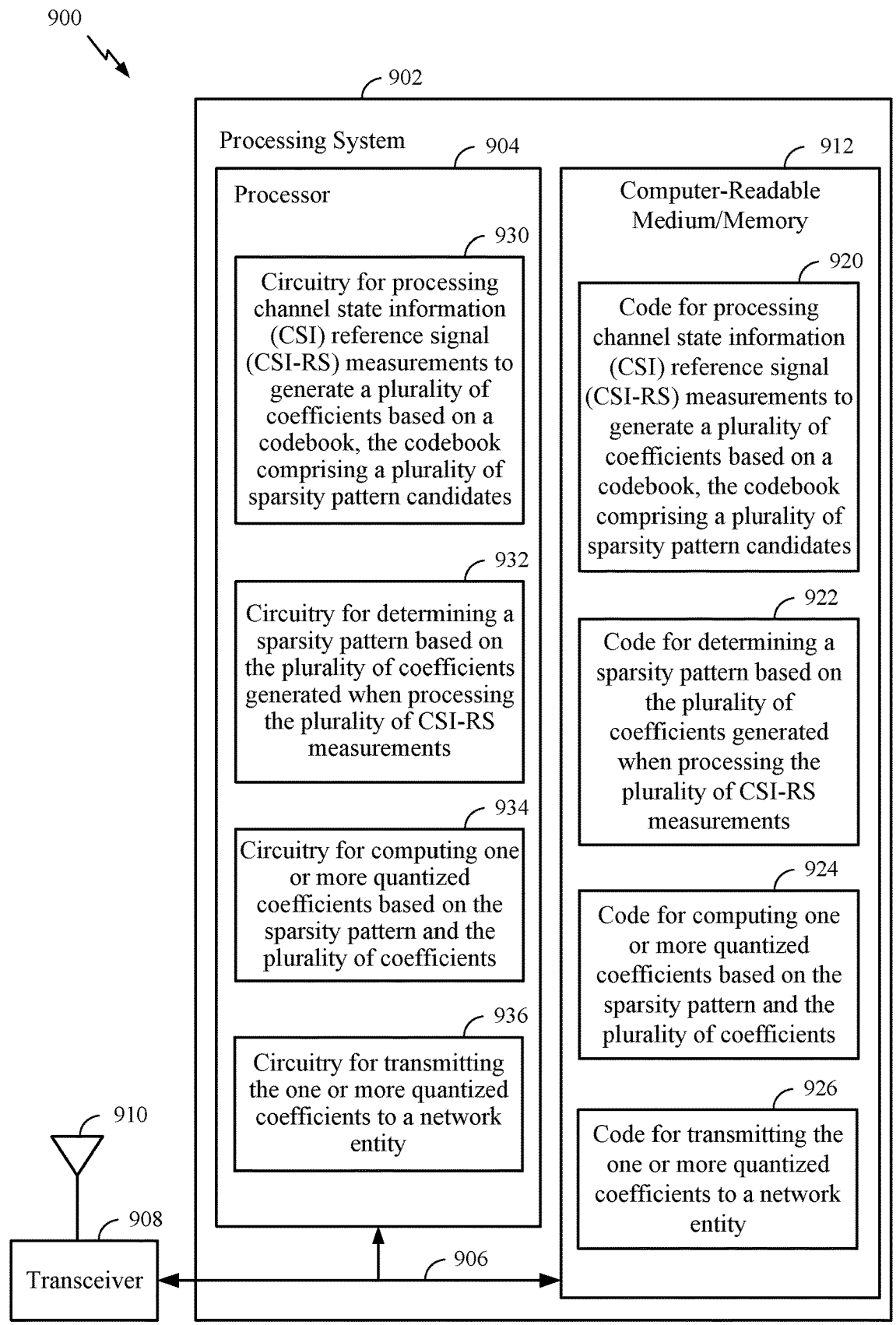
FIG. 9 illustrates a communications device that may include various components configured to perform the operations illustrated in FIG. 6, in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 6. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 6, or other operations for performing the various techniques discussed herein. In certain aspects, computer-readable medium/memory 912 stores code 920 for processing CSI-RS measurements to generate a plurality of coefficients based on a codebook, code 922 for determining a sparsity pattern based on a plurality of coefficients generated when processing the CSI-RS measurements using the codebook, code 924 for computing one or more quantized coefficients based on the sparsity pattern and the plurality of coefficients, and code 926 for transmitting the one or more quantized coefficients to a network entity.

In certain aspects, the processor 904 has circuitry configured to implement the code stored in the computer-readable medium/memory 912. The processor 904 includes circuitry 930 for processing CSI-RS measurements to generate a plurality of coefficients based on a codebook, circuitry 932 for determining a sparsity pattern based on a plurality of coefficients generated when processing the CSI-RS measurements using the codebook, circuitry 934 for computing one or more quantized coefficients based on the sparsity pattern and the plurality of coefficients, and circuitry 936 for transmitting the one or more quantized coefficients to a network entity.

Figure 10:
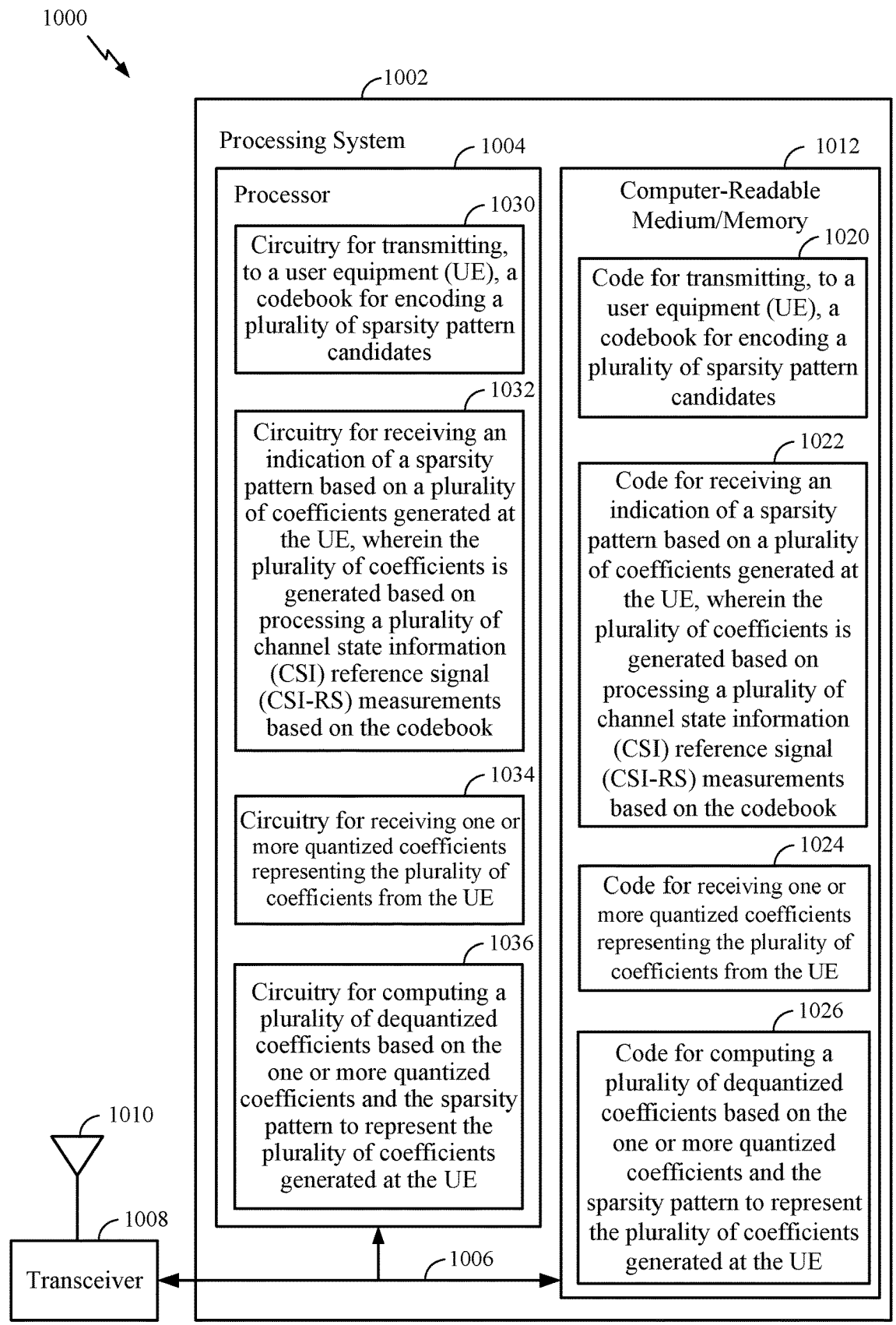
FIG. 10 illustrates a communications device that may include various components configured to perform the operations illustrated in FIG. 7, in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein. In certain aspects, computer-readable medium/memory 1012 stores code 1020 for transmitting, to a UE, a codebook for encoding a plurality of sparsity pattern candidates, code 1022 for receiving an indication of a sparsity pattern based on a plurality of coefficients generated at the UE after processing a plurality of CSI-RS measurements, code 1024 for receiving one or more quantized coefficients representing the plurality of coefficients from the UE, and code 1026 for computing a plurality of recovered coefficients based on the one or more quantized coefficients and the sparsity pattern to represent the plurality of coefficients generated at the UE.

In certain aspects, the processor 1004 has circuitry configured to implement the code stored in the computer-readable medium/memory 1012. The processor 1004 includes circuitry 1030 for transmitting, to a UE, a codebook for encoding a plurality of sparsity pattern candidates, circuitry 1032 for receiving an indication of a sparsity pattern based on a plurality of coefficients generated at the UE after processing a plurality of CSI-RS measurements, circuitry 1034 for receiving one or more quantized coefficients representing the plurality of coefficients from the UE, and circuitry 1036 for computing a plurality of recovered coefficients based on the one or more quantized coefficients and the sparsity pattern to represent the plurality of coefficients generated at the UE.

Example Aspects

Aspect 1: A method for wireless communications by a user equipment (UE), comprising: processing channel state information (CSI) reference signal (CSI-RS) measurements to generate a plurality of coefficients based on a codebook, the codebook comprising a plurality of sparsity pattern candidates; determining a sparsity pattern based on the plurality of coefficients generated when processing the CSI-RS measurements; computing one or more quantized coefficients based on the sparsity pattern and the plurality of coefficients; and transmitting the one or more quantized coefficients to a network entity.

Aspect 2: The method of Aspect 1, wherein the sparsity pattern comprises a bitmap corresponding to channel conditions specific to the UE.

Aspect 3: The method of Aspect 2, further comprising receiving the codebook from the network entity, wherein the sparsity pattern is indicated by an index of a codeword corresponding to one of the plurality of sparsity pattern candidate.

Aspect 4: The method of Aspect 1, further comprising transmitting a report indicating the determined sparsity pattern to the network entity.

Aspect 5: The method of Aspect 1, wherein the plurality of coefficients are generated using an artificial intelligence (AI) framework.

Aspect 6: The method of Aspect 5, wherein processing CSI-RS measurements comprises generating the plurality of coefficients using an encoder of the AI framework.

Aspect 7: The method of Aspect 1, wherein the one or more quantized coefficients occupy a size smaller than that of the plurality of coefficients.

Aspect 8: The method of Aspect 7, wherein the one or more quantized coefficients are recoverable to represent the plurality of coefficients based on the sparsity pattern.

Aspect 9: A method for wireless communications by a network entity, comprising: transmitting, to a user equipment (UE), a codebook for encoding a plurality of sparsity pattern candidates; receiving an indication of a sparsity pattern based on a plurality of coefficients generated at the UE, wherein the plurality of coefficients is generated based on processing a plurality of channel state information (CSI) reference signal (CSI-RS) measurements based on the codebook; receiving one or more quantized coefficients representing the plurality of coefficients from the UE; and computing a plurality of recovered coefficients based on the one or more quantized coefficients and the sparsity pattern to represent the plurality of coefficients generated at the UE.

Aspect 10: The method of Aspect 9, wherein the sparsity pattern comprises a bitmap corresponding to channel conditions specific to the UE.

Aspect 11: The method of Aspect 10, wherein the sparsity pattern is indicated by an index of a codeword in the codebook transmitted to the UE.

Aspect 12: The method of Aspect 9, further comprising receiving a report indicating the determined sparsity pattern from the UE.

Aspect 13: The method of Aspect 9, wherein the plurality of coefficients are generated using an artificial intelligence (AI) framework.

Aspect 14: The method of Aspect 13, wherein the AI framework provides a CSI decoder at the network entity, and wherein the CSI decoder receives the one or more quantized coefficients and computes the plurality of recovered coefficients for generating an output CSI.

Aspect 15: The method of Aspect 9, wherein the one or more quantized coefficients occupy a size smaller than that of the plurality of coefficients.

Aspect 16: A user equipment (UE) for wireless communications comprising: a memory; and a processor coupled to the memory, the processor and the memory configured to: process channel state information (CSI) reference signal (CSI-RS) measurements to generate a plurality of coefficients based on a codebook, the codebook comprising a plurality of sparsity pattern candidates; determine a sparsity pattern based on the plurality of coefficients generated when processing the CSI-RS measurements; compute one or more quantized coefficients based on the sparsity pattern and the plurality of coefficients; and transmit the one or more quantized coefficients to a network entity.

Aspect 17: The UE of Aspect 16, wherein the sparsity pattern comprises a bitmap corresponding to channel conditions specific to the UE.

Aspect 18: The UE of Aspect 17, wherein the processor and the memory are further configured to receive the codebook from the network entity, wherein the sparsity pattern is indicated by an index of a codeword of the codebook received.

Aspect 19: The UE of Aspect 16, wherein the processor and the memory are further configured to transmit a report indicating the determined sparsity pattern to the network entity.

Aspect 20: The UE of Aspect 16, wherein the plurality of coefficients are generated using an artificial intelligence (AI) framework.

Aspect 21: The UE of Aspect 20, wherein processing CSI-RS measurements comprises generating the plurality of coefficients using an encoder of the AI framework.

Aspect 22: The UE of Aspect 16, wherein the one or more quantized coefficients occupy a size smaller than that of the plurality of coefficients.

Aspect 23: The UE of Aspect 22, wherein the one or more quantized coefficients are recoverable to represent the plurality of coefficients based on the sparsity pattern.

Aspect 24: An apparatus for wireless communications, comprising: a memory; and a processor coupled to the memory, the processor and the memory configured to: transmit, to a user equipment (UE), a codebook for encoding a plurality of sparsity pattern candidates; receive an indication of a sparsity pattern based on a plurality of coefficients generated at the UE, wherein the plurality of coefficients is generated based on processing a plurality of channel state information (CSI) reference signal (CSI-RS) measurements based on the codebook; receive one or more quantized coefficients representing the plurality of coefficients from the UE; and compute a plurality of recovered coefficients based on the one or more quantized coefficients and the sparsity pattern to represent the plurality of coefficients generated at the UE.

Aspect 25: The apparatus of Aspect 24, wherein the sparsity pattern comprises a bitmap corresponding to channel conditions specific to the UE.

Aspect 26: The apparatus of Aspect 25, wherein the sparsity pattern is indicated by an index of a codeword in the codebook transmitted to the UE.

Aspect 27: The apparatus of Aspect 24, wherein the processor and the memory are further configured to receive a report indicating the determined sparsity pattern from the UE.

Aspect 28: The apparatus of Aspect 24, wherein the plurality of coefficients are generated using an artificial intelligence (AI) framework.

Aspect 29: The apparatus of Aspect 28, wherein the AI framework provides a CSI decoder at the apparatus, and wherein the CSI decoder receives the one or more quantized coefficients and computes the plurality of recovered coefficients for generating an output CSI.

Aspect 30: The apparatus of Aspect 24, wherein the one or more quantized coefficients occupy a size smaller than that of the plurality of coefficients.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   processing channel state information (CSI) reference signal (CSI-RS) measurements to generate a plurality of coefficients based on a codebook, the codebook comprising a plurality of sparsity pattern candidates;
   determining a sparsity pattern based on the plurality of coefficients generated when processing the CSI-RS measurements;
   computing one or more quantized coefficients based on the sparsity pattern and the plurality of coefficients; and
   transmitting the one or more quantized coefficients to a network entity.

2. The method of claim 1, wherein the sparsity pattern comprises a bitmap corresponding to channel conditions specific to the UE.

3. The method of claim 2, further comprising receiving the codebook from the network entity, wherein the sparsity pattern is indicated by an index of a codeword corresponding to one of the plurality of sparsity pattern candidates.

4. The method of claim 1, further comprising transmitting a report indicating the determined sparsity pattern to the network entity.

5. The method of claim 1, wherein the plurality of coefficients are generated using an artificial intelligence (AI) framework.

6. The method of claim 5, wherein processing CSI-RS measurements comprises generating the plurality of coefficients using an encoder of the AI framework.

7. The method of claim 1, wherein the one or more quantized coefficients occupy a size smaller than that of the plurality of coefficients.

8. The method of claim 7, wherein the one or more quantized coefficients are recoverable to represent the plurality of coefficients based on the sparsity pattern.

9. A method for wireless communications by a network entity, comprising:
   transmitting, to a user equipment (UE), a codebook for encoding a plurality of sparsity pattern candidates;
   receiving an indication of a sparsity pattern based on a plurality of coefficients generated at the UE, wherein the plurality of coefficients is generated by processing a plurality of channel state information (CSI) reference signal (CSI-RS) measurements based on the codebook;
   receiving one or more quantized coefficients representing the plurality of coefficients from the UE; and
   computing a plurality of recovered coefficients based on the one or more quantized coefficients and the sparsity pattern to represent the plurality of coefficients generated at the UE.

10. The method of claim 9, wherein the sparsity pattern comprises a bitmap corresponding to channel conditions specific to the UE.

11. The method of claim 10, wherein the sparsity pattern is indicated by an index of a codeword in the codebook transmitted to the UE.

12. The method of claim 9, further comprising receiving a report indicating the determined sparsity pattern from the UE.

13. The method of claim 9, wherein the plurality of coefficients are generated using an artificial intelligence (AI) framework.

14. The method of claim 13, wherein the AI framework provides a CSI decoder at the network entity, and wherein the CSI decoder receives the one or more quantized coefficients and computes the plurality of recovered coefficients for generating an output CSI.

15. The method of claim 9, wherein the one or more quantized coefficients occupy a size smaller than that of the plurality of coefficients.

16. A user equipment (UE) for wireless communications comprising:
   a memory; and
   a processor coupled to the memory, the processor and the memory configured to:
      process channel state information (CSI) reference signal (CSI-RS) measurements to generate a plurality of coefficients based on a codebook, the codebook comprising a plurality of sparsity pattern candidates;

determine a sparsity pattern based on the plurality of coefficients generated when processing the CSI-RS measurements;

compute one or more quantized coefficients based on the sparsity pattern and the plurality of coefficients; and transmit the one or more quantized coefficients to a network entity.

17. The UE of claim 16, wherein the sparsity pattern comprises a bitmap corresponding to channel conditions specific to the UE.

18. The UE of claim 17, wherein the processor and the memory are further configured to receive the codebook from the network entity, wherein the sparsity pattern is indicated by an index of a codeword corresponding to one of the plurality of sparsity pattern candidates.

19. The UE of claim 16, wherein the processor and the memory are further configured to transmit a report indicating the determined sparsity pattern to the network entity.

20. The UE of claim 16, wherein the plurality of coefficients are generated using an artificial intelligence (AI) framework.

21. The UE of claim 20, wherein to process CSI-RS measurements comprises to generate the plurality of coefficients using an encoder of the AI framework.

22. The UE of claim 16, wherein the one or more quantized coefficients occupy a size smaller than that of the plurality of coefficients.

23. The UE of claim 22, wherein the one or more quantized coefficients are recoverable to represent the plurality of coefficients based on the sparsity pattern.

24. An apparatus for wireless communications, comprising:

a memory; and a processor coupled to the memory, the processor and the memory configured to:

transmit, to a user equipment (UE), a codebook for encoding a plurality of sparsity pattern candidates;

receive an indication of a sparsity pattern based on a plurality of coefficients generated at the UE, wherein the plurality of coefficients is generated by processing a plurality of channel state information (CSI) reference signal (CSI-RS) measurements based on the codebook;

receive one or more quantized coefficients representing the plurality of coefficients from the UE; and compute a plurality of recovered coefficients based on the one or more quantized coefficients and the sparsity pattern to represent the plurality of coefficients generated at the UE.

25. The apparatus of claim 24, wherein the sparsity pattern comprises a bitmap corresponding to channel conditions specific to the UE.

26. The apparatus of claim 25, wherein the sparsity pattern is indicated by an index of a codeword in the codebook transmitted to the UE.

27. The apparatus of claim 24, wherein the processor and the memory are further configured to receive a report indicating the determined sparsity pattern from the UE.

28. The apparatus of claim 24, wherein the plurality of coefficients are generated using an artificial intelligence (AI) framework.

29. The apparatus of claim 28, wherein the AI framework provides a CSI decoder at the apparatus, and wherein the CSI decoder receives the one or more quantized coefficients and computes the plurality of recovered coefficients for generating an output CSI.

30. The apparatus of claim 24, wherein the one or more quantized coefficients occupy a size smaller than that of the plurality of coefficients.

* * * * *